(12) United States Patent
Johnston et al.

(10) Patent No.: US 8,430,087 B2
(45) Date of Patent: Apr. 30, 2013

(54) TEMPERATURE MEASUREMENT MEANS FOR COOKING APPLIANCES

(75) Inventors: Robert Johnston, Columbus, GA (US); Joe Andrews, Fortson, GA (US)

(73) Assignee: Char-Broil, LLC, Columbus, GA (US)

( * ) Notice: Subject to any disclaimer, the term of this patent is extended or adjusted under 35 U.S.C. 154(b) by 174 days.

(21) Appl. No.: 12/344,325

(22) Filed: Dec. 26, 2008

(65) Prior Publication Data

US 2009/0165774 A1 Jul. 2, 2009

Related U.S. Application Data

(60) Provisional application No. 61/018,552, filed on Jan. 2, 2008.

(51) Int. Cl.
*A47J 27/00* (2006.01)
*A47J 47/00* (2006.01)

(52) U.S. Cl.
USPC .............................. 126/25 R; 99/445; 99/446

(58) Field of Classification Search ................ 126/25 R, 126/39 BA, 39 G; 99/328, 329 R, 324, 445, 99/446
See application file for complete search history.

(56) References Cited

U.S. PATENT DOCUMENTS

| | | | | |
|---|---|---|---|---|
| 3,842,726 A * | 10/1974 | Fautz | ............................... | 99/425 |
| 3,848,110 A | 11/1974 | Giguere et al. | | |
| 3,935,809 A * | 2/1976 | Bauer | ............................... | 99/447 |
| 4,008,996 A * | 2/1977 | Wells | ............................... | 432/128 |
| 4,815,439 A | 3/1989 | Houck | | |
| 5,406,930 A * | 4/1995 | Ragland et al. | ............. | 126/25 R |
| 5,457,302 A * | 10/1995 | Amano et al. | ................. | 219/492 |
| 5,603,256 A * | 2/1997 | Charlson et al. | ................. | 99/445 |
| 5,619,910 A * | 4/1997 | Farnsworth et al. | ............ | 99/422 |
| 5,628,242 A * | 5/1997 | Higley | ............................. | 99/332 |
| 5,706,797 A * | 1/1998 | Moore et al. | ................. | 126/41 R |
| 6,104,004 A * | 8/2000 | Ragland et al. | ............... | 219/405 |
| 6,114,666 A * | 9/2000 | Best | ............................. | 219/411 |
| 6,225,607 B1 * | 5/2001 | Has et al. | ................. | 219/448.11 |
| 6,260,478 B1 * | 7/2001 | Harneit | ........................... | 99/446 |
| 6,262,399 B1 * | 7/2001 | Lau et al. | ................... | 219/450.1 |
| 6,371,011 B1 * | 4/2002 | Kuechler | ........................ | 99/400 |
| 6,724,294 B2 * | 4/2004 | Morbitzer | ...................... | 337/394 |
| 7,060,942 B2 * | 6/2006 | Friedl et al. | ................... | 219/411 |
| 7,301,127 B1 * | 11/2007 | Derridinger, Jr. | ............ | 219/386 |
| 7,487,717 B2 * | 2/2009 | Lauro | ............................ | 99/445 |
| 7,647,923 B2 * | 1/2010 | Dahl | .............................. | 126/25 A |
| 7,793,649 B2 * | 9/2010 | Barkhouse et al. | ......... | 126/39 G |
| 8,166,870 B2 * | 5/2012 | Badin | ............................. | 99/357 |
| 2005/0051152 A1 | 3/2005 | Cantal | | |
| 2005/0121020 A1 | 6/2005 | McLemore et al. | | |
| 2006/0021517 A1 * | 2/2006 | Best | .............................. | 99/451 |
| 2006/0054029 A1 * | 3/2006 | Lauro | ............................ | 99/445 |
| 2006/0201495 A1 * | 9/2006 | Jones et al. | ................. | 126/25 R |
| 2007/0028912 A1 * | 2/2007 | Gagas et al. | ................. | 126/9 R |
| 2007/0125357 A1 * | 6/2007 | Johnston | ..................... | 126/41 R |
| 2007/0221655 A1 * | 9/2007 | Bridgwater et al. | ......... | 219/494 |
| 2009/0202688 A1 * | 8/2009 | Best | .............................. | 426/240 |
| 2010/0132692 A1 * | 6/2010 | Shaffer | ....................... | 126/39 E |
| 2011/0168158 A1 * | 7/2011 | Barkhouse | ................. | 126/25 R |

* cited by examiner

*Primary Examiner* — Steven B McAllister
*Assistant Examiner* — Frances H Kamps
(74) *Attorney, Agent, or Firm* — McClure, Qualey & Rodack, LLP

(57) ABSTRACT

A cooking appliance having a heating source and a cooking surface disposed above the heating source. A temperature sensing probe is located between the heating source and the cooking surface for indicating to a user the temperature at or near the cooking surface.

3 Claims, 4 Drawing Sheets

TEMPERATURE MEASUREMENT MEANS FOR COOKING APPLIANCES

CROSS REFERENCE TO RELATED APPLICATION

This utility application claims the benefit of and priority to U.S. provisional application entitled, "Temperature Measurement Means for Gas Grill," having Ser. No. 61/018,552, filed Jan. 2, 2008, which is entirely incorporated herein by reference.

BACKGROUND

Gas grills are typically built with an enclosure consisting of two parts, a lower part described as a firebox, containing a heating means, such as a heat producing element, typically a gas burner or burners, and a cooking grate; and an upper part comprising a pivotally connected lid that covers the cooking grate. In order to determine the temperature inside the enclosure, there has normally been supplied a thermo-mechanical temperature gauge attached to the lid, usually in the center near the upper apex of the lid surface but visible to the operator standing in front of the grill. Some variations have been noted such as those that have the temperature gauge removable for use as a supplemental meat thermometer, or those using a thermoelectric sensing method.

A disadvantage of this art is that only the air temperature is being sensed and not the temperature of the cooking grate that is in contact with the food and that imparts sear marks to it. Another disadvantage is that this type of gauge does not accurately account for radiant heating, which may exist if infrared emitting surfaces are used in the cooking system.

As a result, much cooking is begun with the cooking grate excessively hot. The cooking grate, being in close proximity to the burners, may be significantly hotter than an optimum searing temperature. Some studies have been released that claim such an environment is unhealthy, as the resultant burning of the food surfaces may lead to the formation of harmful substances. While this may or may not be the case, an excessively high temperature can indeed burn the food, or at least lead to the food becoming too dry.

Thus, the chef is left with, what amounts to, guesswork in an important part of the cooking process. With an accurate temperature reading omitted from the cooking equation, an educated guess regarding the appearance of the food, the time it needs to be seared or cooked, and other relatively unscientific factors such as touch and overall experience are all the chef has at their disposal.

It is to address at least some of the deficiencies in the prior art and the above-noted problems that the present disclosure is directed.

SUMMARY

In the present development, the thermometer is integrated with the cooking grate in the following manner. In one embodiment, the cooking grate consists of inverted U shaped metal stampings with the food supported on the closed top of the inverted U and the open bottom of the U being exposed to heat from the heating system. A linear probe is run from the outside of the enclosure into the cavity formed inside the U shape to an appropriate position. In one embodiment, the cooking grate is shown right above an infrared re-emitter built according to US Patent App. 20060021517, but this is not necessary for function and some other combination of gas burners and other heating sources could be placed below the cooking grate. The cooking grate could also be made of a cast metal formed in a general U shape to protect the upper surface of the probe and allow the lower surface of the probe to be exposed to convective and/or radiative heat. In addition the cooking grate could be constructed in a number of other ways to protect the top of the temperature probe from exposure to food debris and damage during cooking and cleaning and to allow the lower surface of the probe to be exposed to convective and/or radiative heat.

One advantage of this system is that the temperature is measured very close to the point of contact of the cooking grate to the food thereby giving the most representative and accurate measurement to provide information for the cooking process.

Various temperature measuring devices may be utilized, such as a thermo-mechanical gauge using a bimetallic element, other types of devices utilizing thermo-hydraulic and thermoelectric effect, and others could be placed in the same or in a proximate position.

The number of such temperature measuring devices used can vary, from one below the grate at some appropriate chosen place to one above the center line of each heating element below the cooking grate.

In addition to gas grills, this device in its various embodiments could be used on grills which use an electric heating element of some kind under the cooking grate or which uses charcoal as a heating source instead of a gas burner as heretofore described. Further, the device can also be used with ranges, cooktops and other appliances used for cooking.

Various additional objects and advantages provided by the presently disclosed device will become apparent from the following detailed description, taken in conjunction with the accompanying drawings.

DETAILED DESCRIPTION

Figure 1:
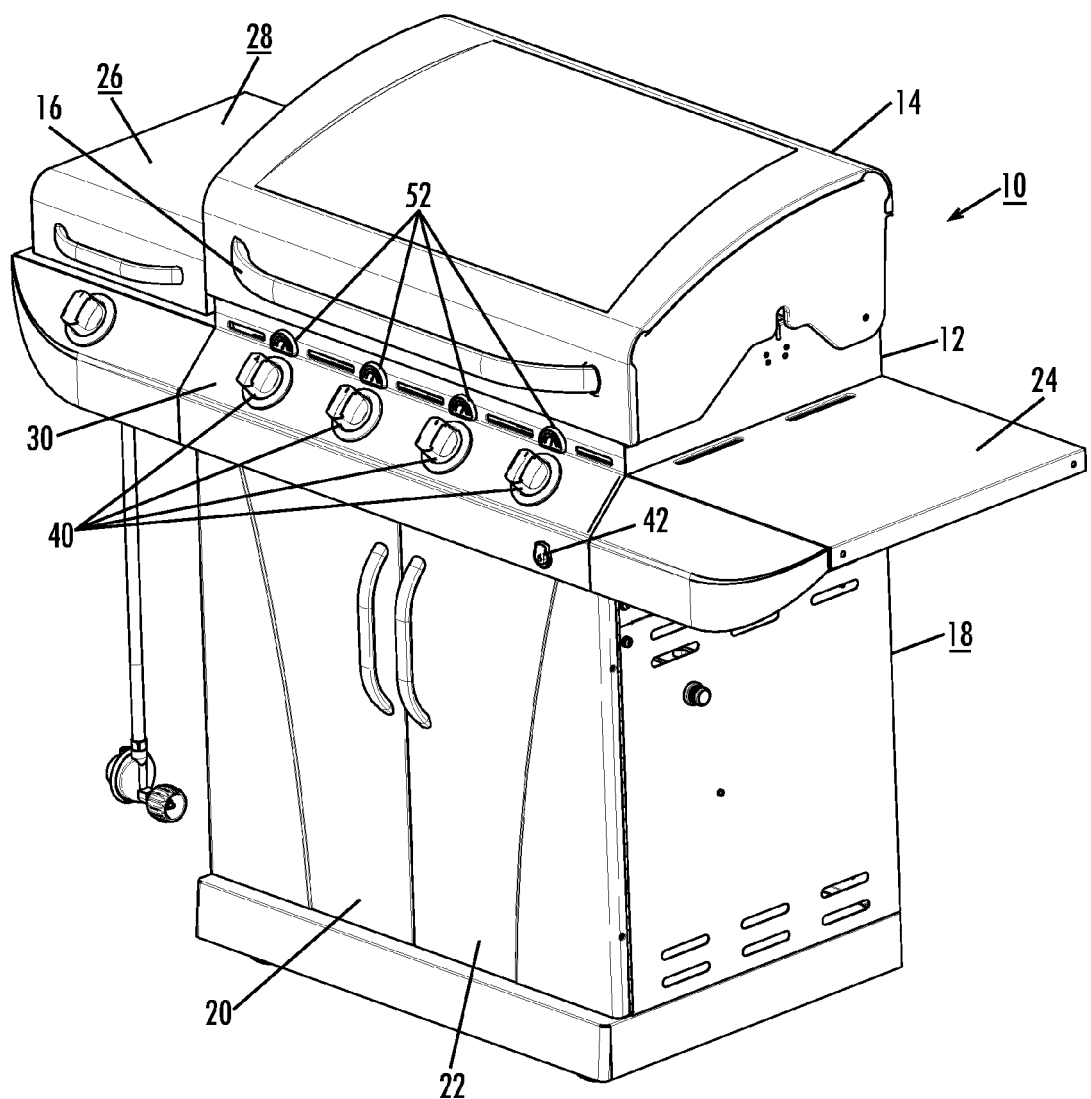
FIG. 1 is a perspective view of the representative barbecue grill equipped with the temperature measuring device disclosed herein.

Referring now more specifically to the drawings, and to FIG. 1 in particular, numeral 10 designates generally a pedestal mounted gas grill. The grill includes a lower fire box 12 and a lid or cover 14 which is hingedly mounted to the fire box 12. Handle 16 is mounted to the front of the cover and is used to raise the cover for access to food being cooked on the grill. In the embodiment shown, the grill is mounted on a pedestal 18 provided with access doors 20, 22. The pedestal 18 forms an enclosure, which can be used for storage of non-combustible items, such as grilling tools, utensils, etc. and the like. Grills of this type can be constructed using stainless steel, aluminum, other types of metals, and many other suitable, heat-resistant materials such as ceramics.

The pedestal 18 itself may contain wheels, typically in the form of casters (not shown) for use in moving the grill from one area to another. In other cases, the grill may be mounted on a stationary post or in a permanent enclosure in an outdoor kitchen-type environment. The pedestal 18 may include one or more side shelves, such as shelf 24 and/or an optional side burner 26, the cover 28 of which may also serve as a shelf, this arrangement being relatively conventional in nature.

The grill 10 further contains a front panel 30, which is typically used for placement of the barbecue grill controls. In the embodiment shown, the front panel 30 is used for mounting the valve or valves 40 which control the flow of gas to the burners and may also include a switch 42 for an electronic igniter or like means for igniting the gas supplied to the burners. While the description herein is primarily focused on the use of the present device with a gas barbecue grill, it is to be understood that the device can also be used with infrared, electric, and even charcoal grills, cooking ranges and other devices in which a cooking grate is employed to suspend food over a heating source and also with solid surface cook tops.

Figure 2:
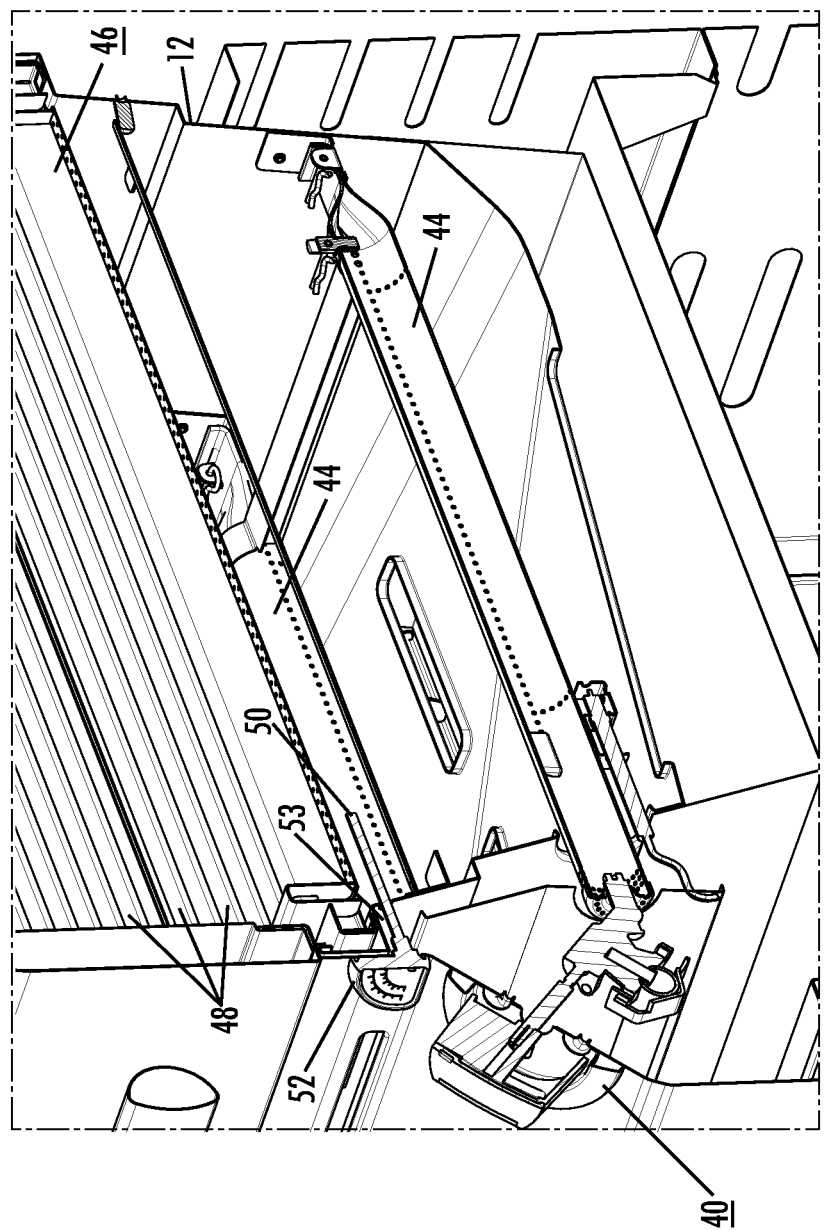
FIG. 2 is a partial prospective and cut away view showing an embodiment of the present device.

Referring now to FIG. 2, an enlarged, close up, and cut away view of the representative grill 10 is shown. Mounted in the fire box 12 is at least one burner 44, and in some cases a plurality of such burners. The gas burners 44 may be in the form of tubes, as shown, or plate-like structures having hollow interiors for receiving and mixing a gas/air mixture introduced from a propane tank, natural gas source, or other fuel supply. Gas is supplied to the burner 44 through valve 40 which in turn is in communication with a gas line (not shown). Mounted above the burner 44 is a cooking grate 46 which can be supplied in many different forms. In the cooking grate shown in FIG. 2, the cooking grate is comprised of a series of inverted U-shaped ribs 48 which support the food being cooked on the grill and also conduct heat from the burner or burners 44 to the food being cooked. While capable of many different forms and materials, it is relatively common to construct the cooking grate out of stainless steel, cast iron, chromed wire, and other heat resistant materials.

Disposed beneath the cooking grate 46 is a temperature sensing means, such as probe 50. The probe 50 is constructed from a heat resistant material, for example, metals, ceramics, or any other suitable material. The probe 50 can be of any length, shape, or size, with a suitable construction being shown as a relatively short, linear, metallic element. The probe 50 can also be formed as part of the cooking grate and then operatively connected to a temperature gauge. The probe 50 is located beneath the opening of the inverted u or v-shaped ribs 48 so as to be shielded from any food drippings, grease, etc. generated during cooking. The temperature probe 50 is operatively connected in some embodiments to a temperature gauge 52 which is mounted on the control panel 30. The probe and/or temperature gauge can also be connected to a control means, control element, microprocessor, or the like, which controls the flow of fuel or other means of heating when the grilling surface reaches a desired temperature.

In the presently disclosed embodiment, a plurality of temperature probes 50 are provided, spaced at regular intervals, spanning the width of the grill 10 under the cooking grate 46. Each of these temperature probes 50 is associated with a temperature gauge 52 so as to measure the temperature in the immediate or near vicinity of the cooking grate 46 at various locations in the grill 10. The probe 50 can extend from the temperature gauge 52 through an aperture 53 formed in the front panel 30 as shown in FIG. 2 or, alternatively, could extend over or under the panel, depending on the construction of the grill. The probe 50 can also extend through a front wall of a cooking grate having such a construction, for example, where the cooking grate is formed in a box-like construction, to a position beneath the actual cooking surface. The temperature gauge can be of any suitable type, providing a temperature reading in analog, digital, or graphic form.

It is contemplated within the scope and spirit of this disclosure that a single probe 50 and associated temperature gauge 52 will be sufficient for measuring the temperature at or near the cooking grate 46. However, any number of probes 50 and associated gauges 52 can be employed, depending on the size of the grill 10 and the design thereof which may be set up to grill specific items in specific locations on the cooking grate or grates 46. For example, the grill may have a searing section, a griddle section, a smoking or slow cooking section, etc. Similarly, the disclosure is not limited by the shown appearance of the probe 50 itself as it can be of any length or shape, as noted, and can be mounted as shown in the front of the grill 10, on either side, in the back, etc. With any of these alternate arrangements, appropriate means would be employed to transfer the temperature reading from the probe 50 to an associated temperature gauge 52 to convey the desired information to the chef.

While it is most advantageous to locate the temperature probe 50 below the cooking grate 46 where it is shielded from cooking residues, grease, etc. The concept of measuring the temperature at or near the cooking surface can be achieved with a probe or the like mounted at the level of the cooking surface or even a relatively short distance above the cooking surface. Appropriate means to shield the probes would be employed in these instances. It is also possible and contemplated by this disclosure that a temperature sensing means could be mounted at the lower edge of the lid of the grill, or integral with the lid itself so as to be near the cooking surface when the lid is closed. The same principle also applies to the firebox itself, as the temperature sensing means can be integrated with the upper edge thereof, at or in the vicinity of the cooking grate.

Figure 4:
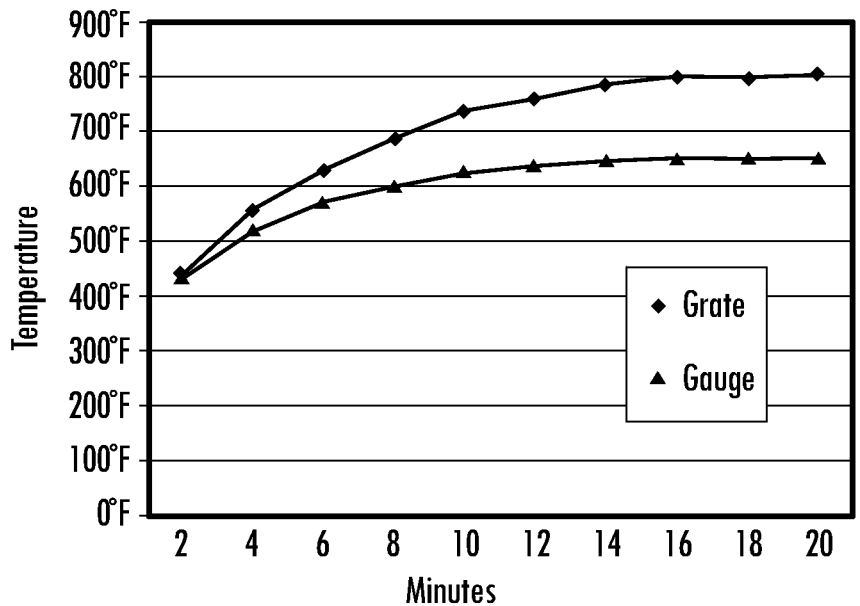
FIG. 4 is a graph illustrating temperature of the cooking grate and the temperature gauge reading in a grill representative of the prior art.
Figure 5:
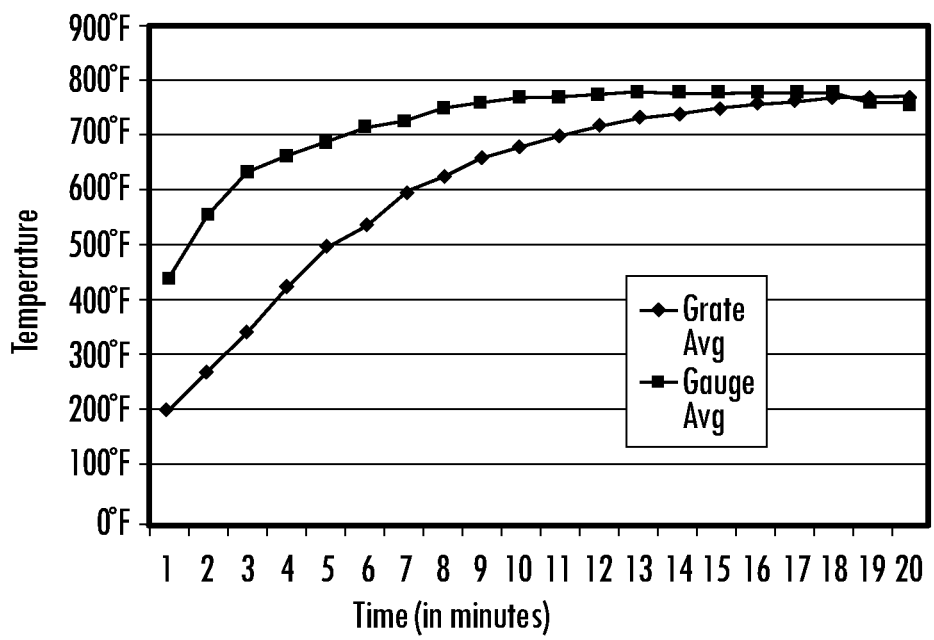
FIG. 5 is a graph illustrating the temperature of the cooking grate and the temperature gauge utilizing an embodiment of the device disclosed herein.

The system thereby conveys to the chef information regarding the temperature existing at or near the surface of the cooking grate 46, before the all important initial contact is made with the food being cooked thereon. Tests using the present system have been conducted and the results are shown in FIGS. 4 and 5. FIG. 4 illustrates the temperature inside a prior art grill having a temperature gauge mounted in the lid of the barbecue grill, at a location spaced above the cooking grate. As can be seen, the temperature measured by the gauge begins at approximately 400° F. and reaches a maximum of approximately 650° F. after 20 minutes of pre-heating. In this same grill, the temperature measured at the cooking grate rises from approximately 400° F. to approximately 800° F. in the period of 20 minutes. Thus, to the chef using this prior art grill, the temperature inside the grill is 650° F. However, the temperature of the cooking grate is considerably higher.

The graph in FIG. 5 illustrates measurements taken with the present system. The chart shows that after the time lag between gauge temperature indication and the grate temperature measurement within the typical 15 minute warm-up time, the temperature gauge indication and the actual measured temperatures are quite close and remain so while the grill is in operation. Thus, it can be seen from the graphs that the chef is provided with an extremely accurate reading of the temperature at or near the surface of the cooking grate which is in contact with the food being cooked thereon.

Figure 3:
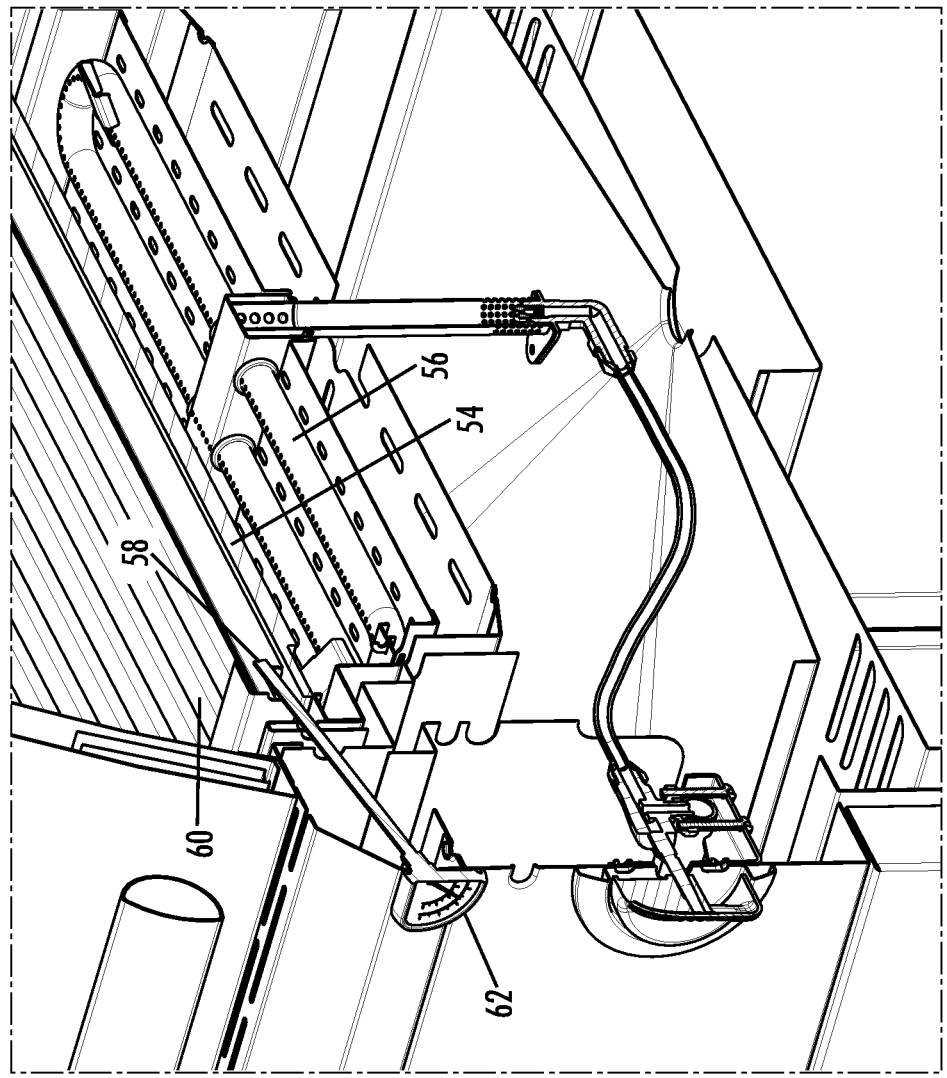
FIG. 3 is a partial perspective and cut away view showing an alternate embodiment of the present device.

Referring back to FIG. 3, an alternate embodiment of the present device is illustrated. In this particular embodiment, the grill contains an infrared emitter 54 which is mounted in the fire box 12 above the burner 56. Grills utilizing such an infrared emitter can achieve much higher temperatures than conventional grills that lack the emitter. In fact, it is common for such grills to generate temperatures at the cooking grate 46 in excess of 900° F., compared to the 700-800° F. temperatures achieved by conventional gas grills utilizing only a burner and cooking grate. In such a grill, the need for information regarding the temperature of the cooking grate or in the near vicinity thereof is even more essential for successful and proper cooking. As illustrated, temperature probe 58 is disposed above the infrared emitter 54 and below the cooking grate 60. The probe 58 is associated with a temperature gauge 62 which, as in the previously disclosed embodiment is provided on the control panel 30 to convey the relevant temperature information to the chef. Also, as discussed hereinabove, the probe 58 can be of any length, dimension, shape, etc., and can be mounted in a plurality of locations beneath the cooking grate 60 and above the infrared emitter 54.

While an embodiment of a temperature measurement means for gas grills and alternate embodiments thereof have been shown and described in detail hereinabove, various additional changes and modifications may be made without departing from the scope of the present disclosure.

Therefore, having thus described the invention, at least the following is claimed:

1. A cooking appliance having a heating source including a gas burner and an infrared emitter, and a cooking surface disposed above said emitter, an improvement comprising a plurality of spaced temperature sensing means mounted between the emitter and the cooking surface for indicating the temperature at or near the cooking surface; each of said temperature sensing means having a corresponding temperature gauge for indicating temperature, said plurality of spaced temperature sensing means providing the temperature at multiple places in the vicinity of the cooking surface and each said temperature sensing means is associatively connected with said control means for the gas burner, said cooking surface having a plurality of bars having substantially inverted U or V shapes, with said temperature sensing means being disposed below the opening of said inverted bars so as to shield said temperature sensing means from grease and food drippings.

2. In a cooking appliance as defined in claim 1, the temperature sensing means further comprising a temperature probe and a temperature gauge connected thereto for displaying the temperature to a user.

3. In a cooking appliance as defined in claim 1, further comprising the temperature sensing means disposed below said cooking surface.

\* \* \* \* \*